April 27, 1937.   H. D. GEYER   2,078,445
RESILIENT SUSPENSION FOR MECHANICAL UNITS
Filed Aug. 3, 1934
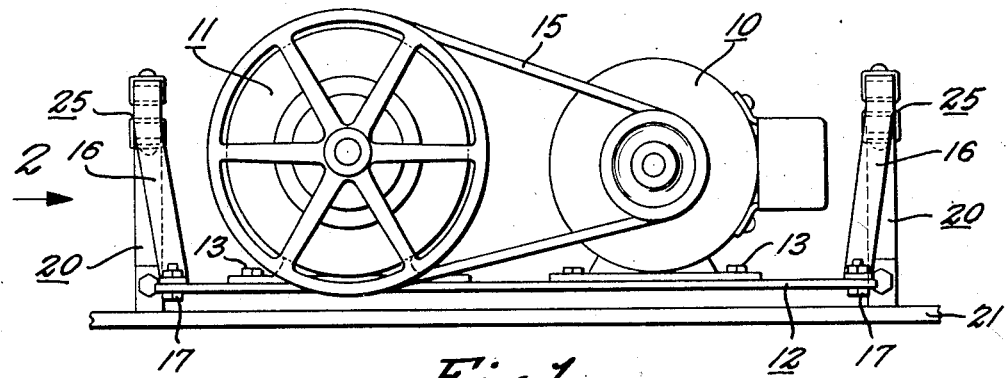
Fig. 1.
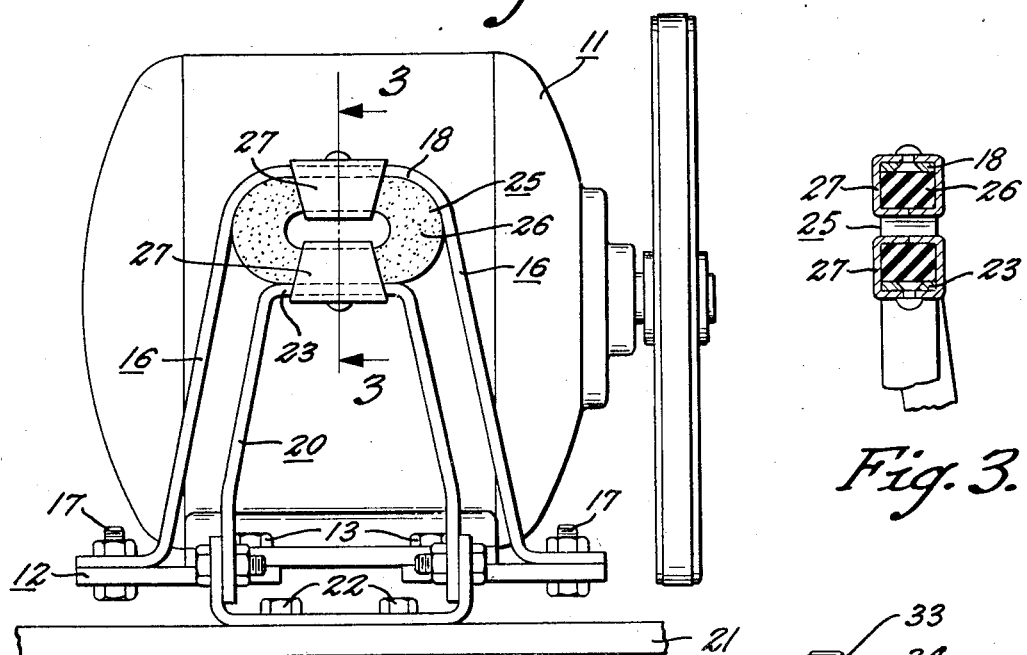
Fig. 2.
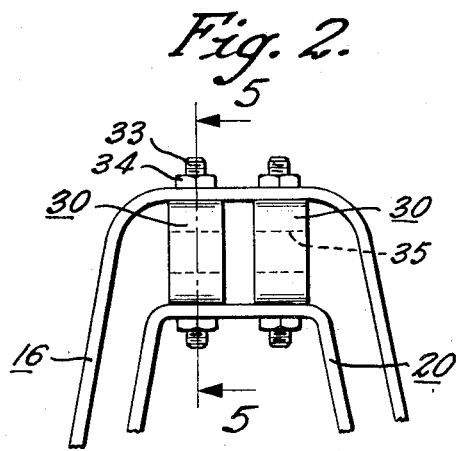
Fig. 4.
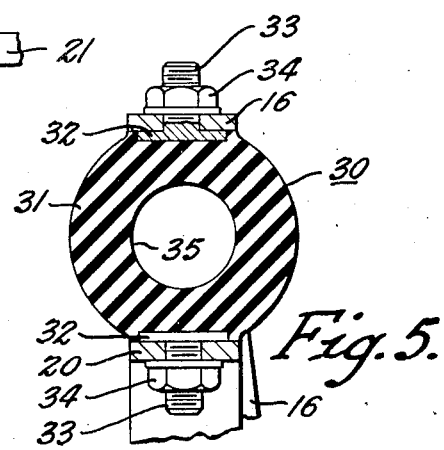
Fig. 3.
Fig. 5.
INVENTOR
Harvey D. Geyer
BY
Spencer Hardman & Fehr
ATTORNEYS Patented Apr. 27, 1937

2,078,445

UNITED STATES PATENT OFFICE 2,078,445

RESILIENT SUSPENSION FOR MECHANICAL UNITS

Harvey D. Geyer, Dayton, Ohio, assignor to General Motors Corporation, Detroit, Mich., a corporation of Delaware Application August 3, 1934, Serial No. 738,180

3 Claims. (Cl. 248—22)

This invention relates to a flexible mounting arrangement of a power unit and compressor for electric refrigerators and the like.

An object of the invention is to provide a simple yet highly efficient flexible mounting arrangement for reducing the transmission of sound or other vibrations from the moving machinery of a refrigerator to the refrigerator box or other support.

According to this invention the electric motor and the driven compressor are rigidly mounted in any convenient manner to an oscillatable base which thus supports all parts of the machinery which causes vibrations. This base is provided with upstanding mounting brackets at two opposed ends thereof and resilient rubber mounts connect the upper ends of these two brackets to suitable stationary supports. The upstanding brackets serve the important function of raising the resilient connectors at the opposed ends of the base to a level not far removed from that of the center of mass of the electric motor and the compressor. Thus the relatively rigid suspended unit will be quite free to oscillate as a unit about an axis passing adjacent its center of mass, or in other words, about a line passing through the centers of gravity of the motor and compressor. By thus raising the line passing through the two resilient connectors to a level approximating the major polar axis of the suspended unit, the main oscillations of said suspended unit can occur more freely and with a minimum transmission of vibration through the resilient connectors to the stationary supports.

A more specific object of the invention is to provide an improved form of resilient connector which is universally yieldable but which is especially designed to permit the above-described main rotary oscillations.

Further objects and advantages of the present invention will be apparent from the following description, reference being had to the accompanying drawing, wherein a preferred embodiment of the present invention is clearly shown.

In the drawing:

Fig. 1 is a side elevation of a mounting arrangement of an electric motor and refrigerant compressor for an electric refrigerator, according to this invention.

Fig. 2 is an end view of Fig. 1, looking in the direction of arrow 2 of Fig. 1.

Fig. 3 is a section on line 3—3 of Fig. 2 and shows the detail construction of the resilient mount.

Fig. 4 shows a modified form of resilient mount substituted for the mount shown in Fig. 3.

Fig. 5 is a section on line 5—5 of Fig. 4.

Similar reference characters refer to similar parts throughout the several views.

The electric motor 10 and the refrigerant compressor 11 driven thereby through the belt 15 are rigidly mounted upon an oscillatable base 12 in any suitable manner, as by the hold-down bolts 13. The upstanding inverted U-shaped mounting brackets 16 are located at opposed ends of base 12 and are rigidly fixed thereto by bolts 17, or in any other suitable manner.

The stationary supporting standards 20 are fixed to the stationary compartment floor 21 by bolts 22 or the like. The flat top 23 of these standards 20 lies directly under the upper portion 18 of the U-brackets 16, as clearly shown in Figs. 2 and 3. The resilient connectors 25 are interposed between the upper ends of standards 23 and the tops of brackets 16 and resiliently support the entire base 12 and all devices mounted thereupon. The connector 25 shown in Figs. 2 and 3 comprises an elongated or oval-shaped molded ring 26 of resilient rubber, rectangular in cross-section as shown in Fig. 3, and two opposed pressed metal clips 27, the upper of which is riveted or welded to portion 18 of bracket 16 while the lower of which is attached to the flat portion 23 of standard 20. These clips 27 are first partially formed and then welded or riveted to the parts 18 and 23 prior to the insertion of the rubber ring 26. The rubber ring 26 is inserted through the openings in the opposed pressed metal clips 27, and then these clips are closed to tightly grip the section of the rubber ring and hold it against slipping. The upper portion 18 of bracket 16 is preferably made to conform to the shape of the rubber ring 26 as clearly shown in Fig. 2.

In operation, the base 12 and all its rigidly attached devices, including the motor 10 and compressor 11, are resiliently supported by the compression of the two opposed rubber rings 26 at opposite ends of base 12. The major polar oscillations of this suspended unit tend to be about an axis passing through the motor 10 and compressor 11 adjacent the centers of mass of these two devices. Since the resilient connectors 25 are raised by means of brackets 16 and standards 20 to a level approximating that of the long polar axis of the suspended unit, such polar oscillations of the suspended unit may occur quite freely and with only very slight reactions upon the stationary standards 20. In other words the vibrations transmitted to the floor 21 by such oscillations of the suspended unit are very much less than would be the case if these same identical connectors 25 were located at a level approximating that of the base 12. This is the fundamental feature of applicant's invention.

In order to make the suspension arrangement more stable, the connectors 25 are preferably located slightly above the above-mentioned polar axis of the suspended unit, as shown in the drawing. By so doing the center of gravity of the suspended unit will be slightly under the line of support thereof, and hence gravity will aid the resilient connectors in returning the suspended unit to its normal vertical position after it is deflected therefrom. In other words, there will be no tendency for the suspended unit to topple over about the line of its support.

In the form shown in Figs. 4 and 5, two separate compression connectors 30 are connected between the stationary standards 20 and the mounting brackets 16 at each end. These connectors 30 each comprises a molded substantially cylindrical ring 31 of resilient rubber having the thin heads 32 of two bolts 33 strongly bonded thereto by vulcanization in situ with the threaded shanks of the two bolts 33 projecting therefrom in opposite directions (as clearly shown in Fig. 5). These threaded shanks are inserted through holes in the members 16 and 21 and nuts 34 applied to attach the connectors 30 thereto in a simple and effective manner. Obviously connectors 30 will yield in all directions. The diameter of the molded cylindrical hole 35 in the molded rubber block 31 may be easily increased or decreased without variation of other dimensions in order to vary the yieldability of the connector according to requirements in any given case. Thus the same vulcanizing mold may be used for making various connectors simply by changing the core pin of the mold which forms the cylindrical hole 35.

While the embodiment of the present invention as herein disclosed, constitutes a preferred form, it is to be understood that other forms might be adopted, all coming within the scope of the claims which follow.

What is claimed is as follows:

1. In combination, a horizontally disposed oscillatable elongated base, an electric motor mounted upon said base adjacent one end thereof, a compressor unit driven by said motor and mounted upon said base adjacent the other end thereof, said motor and compressor each having a main shaft extending transversely of said elongated base, said base having an upright mounting standard at each opposed end thereof located beyond said motor and compressor respectively, and two resilient vibration-cushioning mounts connecting said two standards to adjacent stationary supports respectively, said cushioning mounts being located on a substantially horizontal line passing above but substantially parallel to the longer polar axis of oscillation of the entire suspended unit.

2. In combination, a horizontally disposed oscillatable elongated base, an electric motor mounted upon said base adjacent one end thereof, a compression unit driven by said motor and mounted upon said base adjacent the other end thereof, said motor and compressor each having a main shaft extending transversely of said elongated base, said base having an upright mounting standard at each opposed end thereof located beyond said motor and compressor respectively, and two resilient vibration-cushioning mounts connecting said two standards to adjacent stationary supports respectively, the line of support of said two cushioning mounts being in a vertical plane extending substantially thru the center of gravity of the entire suspended unit but above said center of gravity, whereby the suspension is rendered more stable.

3. In combination, a horizontally disposed oscillatable elongated base, an electric motor mounted upon said base adjacent one end thereof, a compressor unit driven by said motor and mounted upon said base adjacent the other end thereof, said motor and compressor each having a main shaft extending transversely of said elongated base, said base having an upright mounting standard at each opposed end thereof located beyond said motor and compressor respectively, and two resilient vibration-cushioning mounts connecting said two standards to adjacent stationary supports respectively, the line connecting the centers of said two cushioning mounts extending transversely across but above the motor and compressor main shafts, whereby the suspension is rendered more stable.

HARVEY D. GEYER.